(12) United States Patent
Shimomura

(10) Patent No.: US 7,548,154 B2
(45) Date of Patent: Jun. 16, 2009

(54) VEHICLE SECURITY CONTROL SYSTEM

(75) Inventor: Toshio Shimomura, Chiryu (JP)

(73) Assignee: Denso Corporation, Kariya (JP)

( * ) Notice: Subject to any disclaimer, the term of this patent is extended or adjusted under 35 U.S.C. 154(b) by 274 days.

(21) Appl. No.: 11/714,809

(22) Filed: Mar. 7, 2007

(65) Prior Publication Data
US 2007/0222563 A1 Sep. 27, 2007

(30) Foreign Application Priority Data
Mar. 23, 2006 (JP) ............................. 2006-081427

(51) Int. Cl.
B60Q 1/00 (2006.01)
(52) U.S. Cl. .................... 340/426.11; 340/426.17; 340/426.22; 340/5.61; 307/10.3
(58) Field of Classification Search ............ 340/426.11, 340/426.17, 426.22, 425.5, 5.61, 426.13; 307/10.2, 10.3
See application file for complete search history.

(56) References Cited

U.S. PATENT DOCUMENTS

| | | | | |
|---|---|---|---|---|
| 5,711,392 | A * | 1/1998 | Budel | 340/426.28 |
| 5,774,043 | A * | 6/1998 | Mizuno et al. | 340/426.35 |
| 5,926,086 | A | 7/1999 | Escareno et al. | |
| 5,939,975 | A | 8/1999 | Tsuria et al. | |
| 6,130,621 | A * | 10/2000 | Weiss | 340/5.28 |
| 6,525,643 | B1 * | 2/2003 | Okada et al. | 340/426.1 |
| 6,900,723 | B2 | 5/2005 | Yamanaka et al. | |
| 2002/0041125 | A1 * | 4/2002 | Okamitsu et al. | 307/10.5 |
| 2003/0160692 | A1 * | 8/2003 | Nonaka | 340/539.11 |
| 2005/0122208 | A1 | 6/2005 | Kondo et al. | |
| 2005/0179320 | A1 | 8/2005 | Shimomura | |
| 2007/0273489 | A1 * | 11/2007 | Tauchi et al. | 340/426.11 |

FOREIGN PATENT DOCUMENTS

| | | |
|---|---|---|
| DE | 195 21 902 | 12/1996 |
| GB | 2 335 002 A | 9/1999 |
| JP | 6-099778 | 4/1994 |
| JP | 2001-099673 | 4/2001 |
| JP | 2005-164541 | 6/2005 |

OTHER PUBLICATIONS

German Office Action dated Nov. 27, 2008 issued in corresponding DE Application No. 10 2007 012 332.0-51, with English Translation.
GB Search Report dated Jun. 28, 2007 in Application No. GB 0704134.6.
Chinese Official Action dated Feb. 13, 2009, issued in counterpart Chinese Application No. 200710090045.2, with English translation.

* cited by examiner

Primary Examiner—Eric M Blount
(74) Attorney, Agent, or Firm—Nixon & Vanderhye, PC

(57) ABSTRACT

A vehicle security control system receives from a separated communication device a demand signal to prohibit or permit engine operation via an immobilizer. The vehicle control device includes a display for displaying information on the engine operation, a communication unit for receiving the demand signal from the separated communication device and a remote security ECU for providing a control signal according to the demand signal, an immobilizer ECU for setting or unsetting the immobilizer according to the control signal. The immobilizer ECU prohibits the display from displaying the information on the engine operation when the immobilizer ECU unsets the immobilizer even when the separated communication device provides the demand signal to prohibit engine operation.

16 Claims, 2 Drawing Sheets

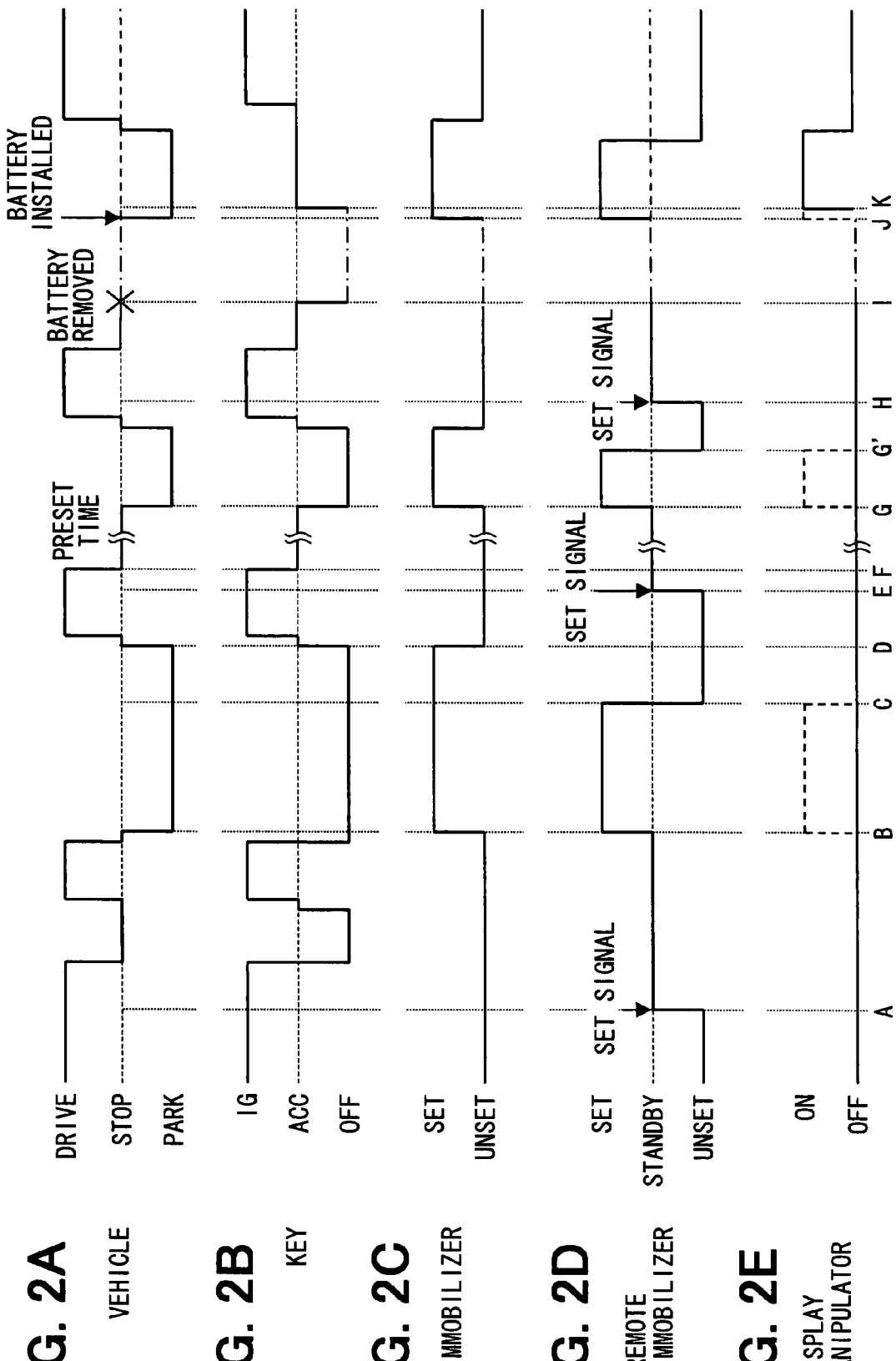

VEHICLE SECURITY CONTROL SYSTEM

CROSS REFERENCE TO RELATED APPLICATION

The present application is based on and claims priority from Japanese Patent Application 2006-0081427, filed Mar. 23, 2006, the contents of which are incorporated herein by reference.

BACKGROUND OF THE INVENTION

1. Field of the Invention

The present invention relates to a vehicle security control system that controls vehicle engine according to a demand signal from a base station.

2. Description of the Related Art

JP-2002-59812-A discloses a vehicle security control system, to which a signal is sent from a base station when the vehicle is stolen. If the vehicle is running, the base station gives an unauthorized driver a caution by way of voice, sound or visual imagery. In such a system, however, the caution may give the unauthorized driver a shock to seriously affect safety drive of the stolen vehicle, which may hinder smooth traffic flow on a road.

SUMMARY OF THE INVENTION

Therefore, an object of the invention is to provide a vehicle security control system that may not seriously affect safety drive of a vehicle even when the vehicle is being driven without authority.

According to a feature of the invention, a vehicle security control system includes a key that provides an ID signal when it is used for operating an engine, a display that displays information on the engine operation, a first communication unit for receiving the ID signal, a second communication unit for receiving a demand signal sent from a separated communication device and control means for controlling the engine operation according to the demand signal. The control means prohibits the display from displaying the information on the engine operation when permitting the engine operation if the separated communication device provides the demand signal to prohibit engine operation. Therefore, a stolen vehicle can be driven by an unauthorized driver without shock, so that a smooth traffic flow on a road can be secured.

In the above vehicle security control system: the control means may control the display to display the information on prohibiting the engine operation when the control means prohibits the engine operation according to the demand signal to prohibit engine operation; the control means may continue to prohibit the engine operation and controls the display to display the information on prohibiting the engine operation although the first communication unit receives the ID signal when the control means continues to prohibit the engine operation according to the demand signal to prohibit engine operation.

Because the stolen vehicle is assumed to be parked at an appropriate place and can not be driven on a road any more, a smooth traffic flow may not hindered.

Further, the information on the engine operation may include information on the demand signal to prohibit engine operation or the demand signal to permit engine operation.

According to another feature of the invention, a vehicle security control system includes a key that provides an ID signal when it is used, a first communication unit for receiving the ID signal, a second communication unit for receiving the demand signal sent from a separated communication device, a control means for controlling the engine operation according to the demand signal; and a manipulating means to be manipulated by a vehicle driver to input a request to the control means. The control means prohibits the display from displaying the information on the engine operation when permitting the engine operation even when the separated communication device provides the demand signal to prohibit engine operation.

In the above system: the control means may permit the manipulating means to prohibit the engine operation when the control means prohibits the engine operation according to the demand signal to prohibit engine operation; the control means may continue to prohibit the engine operation and controls the manipulating means to permit operation to prohibit the engine operation when the control means prohibits the engine operation according to the demand signal to prohibit engine operation although the first communication unit receives the ID signal; and the control means may continue to prohibit the engine operation when the manipulating means is operated and may permit the manipulating means to prohibit the engine operation when the control means prohibits the engine operation according to the demand signal to prohibit engine operation.

The above vehicle security control system may further include a display for displaying information of the engine operation, in which: the manipulating means is manipulated according to information displayed by the display; and the control means prohibits engine operation by prohibiting the display from displaying the information on the engine operation.

In the above vehicle security control system, the information displayed by the display includes information on the demand signal to permit engine operation.

According to another feature of the invention, a vehicle security control system includes a display for displaying information on engine operation, a communication unit for receiving a demand signal from a separated communication device, a remote security ECU for providing a control signal according to the demand signal and an immobilizer ECU for setting or unsetting the immobilizer according to the control signal. The immobilizer ECU prohibits the display from displaying the information on the engine operation when the immobilizer ECU unsets the immobilizer even when the separated communication device provides the demand signal to prohibit engine operation.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 2A-2E are time diagrams of various devices or portions of security control system according to the preferred embodiment of the invention.

DETAILED DESCRIPTION OF THE PREFERRED EMBODIMENTS

Figure 1:
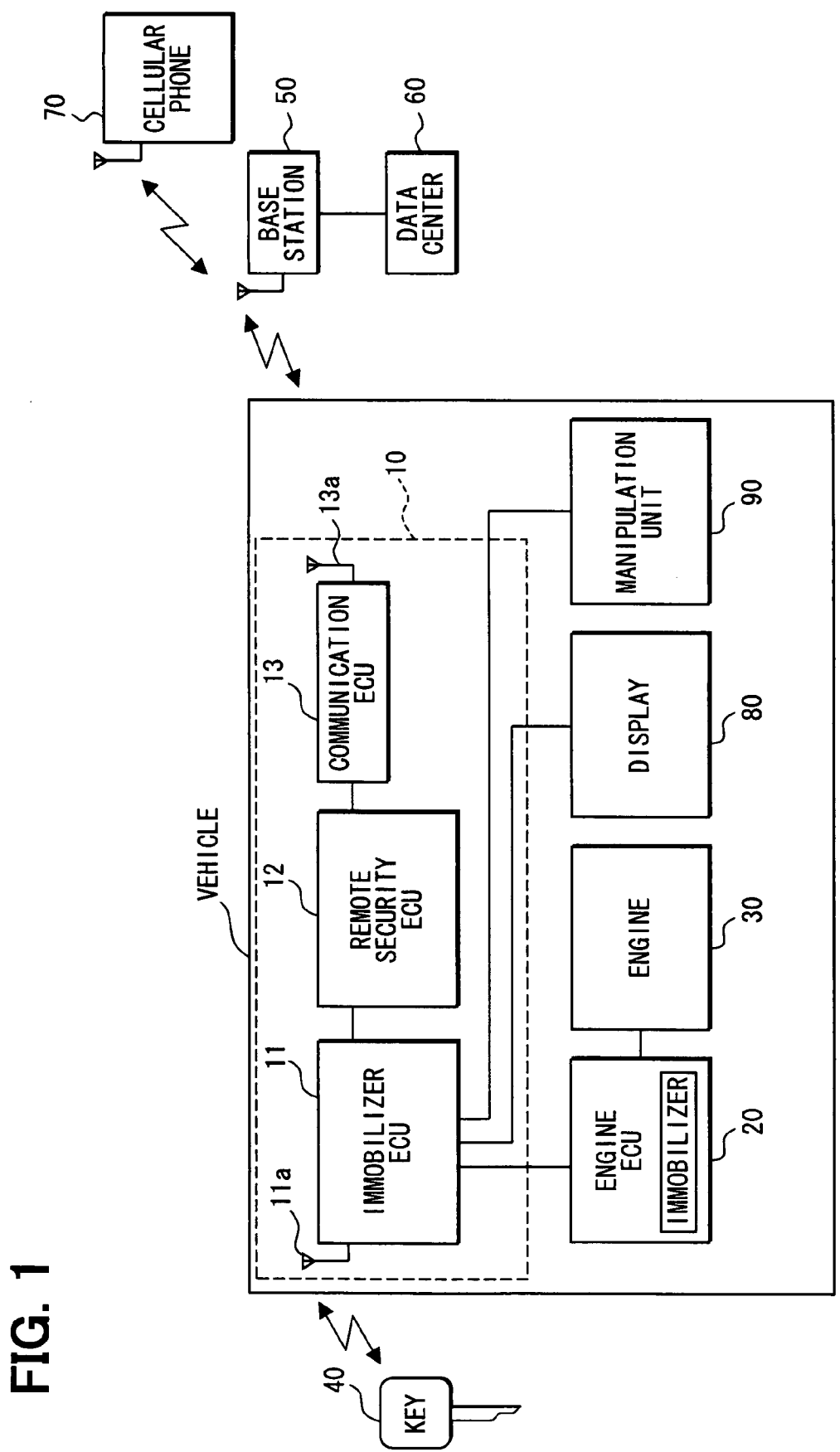
FIG. 1 is a block diagram of a vehicle security control system according to a preferred embodiment of the invention.

A vehicle security control system according to a preferred embodiment of the invention will be described with reference to FIGS. 1 and 2.

As shown in FIG. 1, the vehicle security control system generally includes a security unit 10, an engine ECU 20, an engine 30, a key 40, a base station 50, a data center 60, a cellular phone 70, a display 80, a manipulation unit 90, etc. The security unit 10 includes an immobilizer ECU 11, an antenna 11a, a remote security ECU 12, a communication ECU 13 and an antenna 13a. The security unit 10 is mounted in a vehicle. The immobilizer ECU 11 is mainly constituted of a microcomputer that includes memories such as a ROM, a RAM and an EEPROM, an interface circuit and bass wires for data transmission. The immobilizer ECU 11 detects status or position of the key 40, such as IG (i.e. ignition), ACC (i.e. accessory) or Off (i.e. power off). The immobilizer ECU 11 provides a control signal to prohibit or allow engine operation based on signals that include an ID (identifying) signal sent from the key 40, a remote set signal and a remote unset signal that are outputted from the remote security ECU 12. Incidentally, the function of the immobilizer ECU 11 for providing the engine ECU 20 with a control signal to prohibit engine operation will be referred to as "set the immobilizer" or "setting of the immobilizer", and the function for providing the engine ECU 20 with a control signal to allow engine operation will be referred to as "unset the immobilizer" or "unsetting of the immobilizer". Further, the function of the immobilizer ECU 11 for providing the control signal to prohibit or allow operation of the engine 30 based on the remote set signal or the remote unset signal that is provided by the remote security ECU 12 is referred to as "setting of the remote immobilizer" or "unsetting of the remote immobilizer".

When the immobilizer is set, the immobilizer ECU 11 provides the engine ECU 20 with a control signal to prohibit the operation of the engine 30. On the other hand, the immobilizer ECU 11 provides the engine ECU 20 with a control signal to allow the operation of the engine 30 when the immobilizer is unset.

When the remote immobilizer is set, the immobilizer ECU 11 provides the engine ECU 20 with a control signal to prohibit the operation of the engine 30 even when an identifying signal is sent thereto from the key 40. When the remote immobilizer is unset, the immobilizer ECU 11 provides the engine ECU 20 with a control signal to allow the operation of the engine 30 when an identifying signal is sent thereto from the key 40.

The immobilizer ECU 11 is provided with a standby alert state that occurs only when the remote set signal is received from the remote security ECU 12. The standby alert state is referred to as immobilizer standby-alert state.

The immobilizer ECU 11 controls the display 80 and the manipulation unit 90 based on the identifying signal sent from the key 40, the remote set signal and the remote unset signal sent from the security ECU 12.

The key 40 has a communication unit (not shown) that has an ID number in a key head. The communication unit responds to a call signal sent from the antenna 11a and sends out an answer signal. The antenna 11a is mounted on a portion near a key slot for starting the engine 30. A key switch is disposed in the key slot. When the key 40 is inserted into the key slot, the key switch turns on, and communication is established between the communication unit of the key 40 and the antenna 11a.

The remote security ECU 12 is mainly constituted of a microcomputer that includes memories such as a ROM, a RAM and an EEPROM, an interface circuit and bass wires for data transmission. The remote security ECU 12 sends the remote set signal or the remote unset signal via the communication ECU 13 to the immobilizer ECU 11.

Incidentally, the remote set signal is a demand signal to demand the immobilizer ECU 11 to prohibit the engine operation, and the remote unset signal is a demand signal to demand the immobilizer ECU 11 to permit the engine operation.

The communication ECU 13 is mainly constituted of a microcomputer that includes memories such as a ROM, a RAM and an EEPROM, an interface circuit, bass wires for data transmission and the antenna 13a for communication with the base station 50. The communication ECU 13 sends the remote security ECU 12 the remote set signal or the remote unset signal sent from the base station 50. The communication ECU 13 may be any ECU that can be connected with a radio telephone wire or an internet, such as a vehicle-installed mobile phone.

The engine ECU 20 is mainly constituted of a microcomputer that includes memories such as a ROM, a RAM and an EEPROM, an interface circuit and bass wires for data transmission. The engine ECU 20 allows operations of a starter motor, a fuel injection system, an ignition system, etc., thereby starting the engine 30 only when the immobilizer ECU 11 unsets the immobilizer by the control signal and an engine starting signal is sent from an ignition switch (not shown). The engine ECU 20 does not allow the operation to start the engine when the immobilizer ECU 11 sets the immobilizer.

The display 80 includes a liquid crystal display panel and a backlight. The display 80 ordinarily displays an image that informs setting of the immobilizer when an image signal is sent from the immobilizer ECU 11. A display of a navigation system may be used for the display 80. A loudspeaker of an audio system may be also available. The image may be a sentence such as "remote immobilizer is set", a menu for requesting unsetting or a menu for inputting a code number.

The manipulation unit 90 may be a key switch disposed near the display 80 or a joystick disposed at a center console of a vehicle. The display 80 may have a touch panel.

The base station 50 is a communication device located at a place separated from the vehicle. The base station 50 is connected with the data center 60 that stores various vehicular data.

If a vehicle is stolen, the user of the stolen vehicle communicates the base station by the cellular phone 70 to report that the vehicle was stolen to the data center 60 via the base station 50. Then, the data center 60 sends the remote set signal to the communication ECU 13 of the stolen car via the base station 50.

If the stolen car is found out, the user communicates with the data center 60 via the base station 50 by the cellular phone 70 to report that the vehicle is found out. Then, the data center 60 sends the remote unset signal to the communication ECU 13 of the stolen car.

An operation of the vehicle security control system will be described in more detail with reference to FIG. 2.

If a car with the key 40 is stolen and the key 40 is inserted into the key slot, the immobilizer ECU 11 examines, based on the ID signal of the key 40, whether the key 40 is genuine or not. If the key 40 is found to be genuine, the immobilizer ECU 11 unsets the immobilizer at a time before time A, as shown in FIG. 2C. Accordingly, the status of vehicle power (i.e. IG, ACC or OFF) and the vehicle condition (i.e. drive, stop or park) are set normal, so that the vehicle can be freely driven.

When the vehicle user realizes that the vehicle was stolen and reports the fact to the data center 60 via the base station 50 by the cellular phone 70, the data center 60 sends the remote set signal to the base station 50, which sends the remote set signal to the communication ECU 13 of the stolen vehicle.

The communication ECU 13 receives the remote set signal by the antenna 13a and sends the remote set signal to the remote security ECU 12, which sends the remote set signal to the immobilizer ECU 11. If the immobilizer has been unset based on the ID signal of the key 40 for the period between A and B shown in FIG. 2C, the immobilizer ECU 11 continues to unset the immobilizer. Accordingly, the stolen vehicle can be freely driven during the period between A and B even if the car is temporarily stopped on a road or the key 40 is turned to ACC or OFF. Therefore, stolen car does not hinder traffic flow of the road. If the remote unset signal is sent from the remote security ECU 12 during the period between A and B, it may be desirable to cancel the standby alert state and unset the remote immobilizer.

As long as the immobilizer is being unset during the period between A and B, the display 80 is prohibited from displaying any image or information regarding the setting of the remote immobilizer, and the manipulation unit 90 is prohibited from setting the immobilizer, even if the remote security ECU 12 sends the remote set signal to the immobilizer ECU 11, as shown in FIGS. 2D and 2E. Incidentally, the operation of the manipulation unit 90 includes inputting a command for unsetting the remote immobilizer and inputting the code number.

If the operation of the manipulation unit 90 relating to the setting of the remote immobilizer is carried out, the immobilizer ECU 11 may prohibit the manipulation unit 90 from setting the immobilizer by prohibiting the operation of the display 80 from displaying any images or menus relating to the setting of the remote immobilizer (such as the demand for unsetting the remote immobilizer or inputting a code number for unsetting). Accordingly, the unauthorized driver can drive the stolen car without shocks that may otherwise be given to the unauthorized driver by the display.

If the key 40 is removed from the key slot, the vehicle power is in the Off state during the period between A and B and the vehicle condition is in the park state as shown in FIGS. 2A and 2B. If the immobilizer ECU 11 receives the remote set signal from the base station 50 via the remote security ECU 12 for the same period, as shown in FIG. 2D, in which the remote immobilizer is in the standby alert state, the immobilizer ECU 11 sets the immobilizer and the remote immobilizer at time B, as shown in FIGS. 2C and 2D. When the immobilizer ECU 11 sets the immobilizer, it sends the control signal to demand the engine ECU 20 to prohibit the operation of the engine 30. As long as the immobilizer and the remote immobilizer are set for a period between B and C in FIG. 2D, the immobilizer ECU 11 does not unset the immobilizer even if the genuine key 40 is inserted into the key slot. Thus, a continuous unauthorized operation of the vehicle can be prevented.

If the immobilizer ECU 11 sets the immobilizer and the remote immobilizer based on the ID signal of the key 40 and the remote set signal, it is presumed that the stolen vehicle is parked. Therefore, displays by the display 80 and operations by the manipulation unit 90 that relate to the setting of the remote immobilizer are permitted, as shown in a period between B and C and a period between G and G' in FIG. 2E. The displays by the display 80 and operations by the manipulation unit 90 that relate to the setting of the remote immobilizer are permitted in the following case: the remote set signal is provided to set the immobilizer; and the ID signal is provided by the genuine key 40 inserted into the key slot. In other words, the display and operations by the manipulation unit 90 are not permitted at time J, as shown in Fig. E, even when the immobilizer is set due to the remote set signal that is provided as shown in Fig. D. For example, the displays by the display 80 and operations by the manipulation unit 90 that relate to the setting of the remote immobilizer are permitted at time K when the status of the vehicle power changes from OFF to ACC and the ID signal is provided as shown in FIG. 2B.

If the stolen car is found out where the user or an authorized person can access the car, the user communicates with the base station 50 by the cellular phone 70 to report that the vehicle was found to the data center 60. Then, the data center 60 sends the remote unset signal to the base station 50, which sends the same to the communication ECU 13 of the found vehicle. When the communication ECU 13 receives the remote unset signal via the antenna 13a, it delivers the remote unset signal to the immobilizer ECU 11. At time C, the immobilizer ECU 11 unsets the remote immobilizer in FIG. 2D. However, the immobilizer ECU 11 continues to set the immobilizer as long as the immobilizer ECU 11 sets the immobilizer based on the ID signal of the key 40 for a period between time C and time D even if the remote security ECU 12 provides the remote unset signal to unset the remote immobilizer, as shown in FIG. 2C. Therefore, no one can drive the found vehicle without the genuine key 40.

If the immobilizer was unset as soon as the remote immobilizer is unset, the immobilizer ECU 11 would give a control signal to permit the operation of the engine 30. This means that the stolen vehicle may be driven by a key that is not genuine. Therefore, the immobilizer ECU 11 examines whether the ID signal that is sent from the key 40 is correct or not when the key 40 is inserted into the key slot, (e.g. for a period between C and D) and unsets the immobilizer at time D if the key is found to be genuine, as shown in FIG. 2C.

The immobilizer ECU 11 maintains unsetting of the immobilizer and places the remote immobilizer on the standby alert at time E, as shown in FIG. 2D, when it receives the remote set signal that is caused by the user's report that the vehicle is stolen from the base station 50 via the remote security ECU 12. The immobilizer ECU 11 examines whether the period in which the status of the power ACC continues is longer than a preset time or not. At time F, the immobilizer ECU 11 sets the remote immobilizer when the vehicle condition changes from "drive" to "stop", as shown in FIG. 2A, and the power status changes from IG to ACC at time F, as shown in FIG. 2B, and when the ACC status continues for a period longer than the preset time (at time G), which means that the stolen vehicle is completely parked. Therefore, the vehicle may not hinder a traffic flow on a road.

The remote immobilizer may be set according to the following actions: the immobilizer is set because of the unauthorized key (wrong ID signal); the immobilizer is set within a preset time; a burglar alarm is set; a steering wheel is locked due to the burglar alarm; and/or a battery is removed or changed.

The remote immobilizer can be set when the genuine key 40 is removed from the key slot. The immobilizer ECU 11 examines if the immobilizer is set or not based on the ID signal of the key 40 if the remote set signal is provided by the remote security ECU 12. The immobilizer ECU 11 places the remote immobilizer standby alert if the immobilizer is not set and sets the remote immobilizer if the immobilizer is set. If the genuine key 40 is removed from the key slot, it is likely that the vehicle is not on a road. Therefore, even if the vehicle is prohibited from running on a road, the vehicle does not hinder the traffic flow of the road.

If the remote security ECU 12 provides the remote set signal, the immobilizer ECU 11 examines whether the preset time has passed or not after the immobilizer has been set. If the preset, time has not passed, the immobilizer ECU 11 places the remote immobilizer on standby alert. On the other hand, the immobilizer ECU 11 sets the remote immobilizer if the preset time has passed. This examination and operation ensure that the vehicle whose operation is to be prohibited is not on a road.

If the remote security ECU 12 provides the remote set signal, the immobilizer ECU 11 may examine whether the burglar alarm is set or not after the key switch is turned off. If the burglar alarm is not set, the immobilizer ECU 11 places the remote immobilizer on standby alert. On the other hand, the immobilizer ECU 11 sets the remote immobilizer if the burglar alarm is set. This examination and operation also ensure that the vehicle whose operation is to be prohibited is not on a road.

If the remote security ECU 12 provides the remote set signal, the immobilizer ECU 11 may examine whether the steering wheel is locked or not after the key switch is turned off. If steering wheel is not locked, the immobilizer ECU 11 places the remote immobilizer on standby alert. On the other hand, the immobilizer ECU 11 sets the remote immobilizer if the steering wheel is locked. This examination and operation also ensure that the vehicle whose operation is to be prohibited is not on a road.

If the remote security ECU 12 provides the remote set signal at time H while the immobilizer ECU 11 unset the immobilizer to permit the operation of the engine 30, the immobilizer ECU 11 maintains the immobilizer to keep permitting the operation of the engine 30 and places the remote immobilizer on standby alert, as shown in FIG. 2D. The immobilizer 11 examines whether the battery is removed or not. If the battery is removed, the immobilizer ECU 11 sets the immobilizer and the remote immobilizer at time J, as shown in FIGS. 2C and 2D. This examination and operation also ensure that the vehicle whose operation is to be prohibited is not on a road.

In the previous embodiment, the key 40 can be replaced with any mobile smart key that sends an answer signal including the ID number in response to a request signal provided by a vehicle security device. The cellular phone 70 may be replaced with a stationary home telephone.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle security control system communicates with a separated communication device to receive from the same a demand signal to prohibit or permit engine operation, said vehicle control device comprising:
    a key for operating the vehicle, said key providing an ID signal when it is used;
    a display for displaying information on the engine operation;
    a first communication unit for receiving the ID signal;
    a second communication unit for receiving the demand signal sent from said separated communication device; and
    control means for controlling the engine operation according to the demand signal,
    wherein said control means prohibits said display from displaying the information on the engine operation when permitting the engine operation if said separated communication device provides the demand signal to prohibit engine operation.

2. A vehicle security control system as in claim 1, wherein said control means controls said display to display the information on the engine operation when said control means prohibits the engine operation according to the demand signal to prohibit engine operation.

3. A vehicle security control system as in claim 1, wherein said control means continues to prohibit the engine operation and controls said display to display the information on the engine operation when said control means prohibits the engine operation according to the demand signal to prohibit engine operation although said first communication unit receives the ID signal.

4. A vehicle security system as in claim 1, wherein the information on the engine operation includes information on the demand signal to prohibit engine operation.

5. A vehicle security control system as in claim 1, wherein the information on the engine operation includes information on the demand signal to permit engine operation.

6. A vehicle security control system that communicates with a separated communication device for receiving from the same a demand signal to prohibit or permit engine operation, said vehicle control device comprising:
    a key for operating the vehicle, said key providing an ID signal when it is used;
    a first communication unit for receiving the ID signal;
    a second communication unit for receiving the demand signal sent from said separated communication device;
    control means for controlling the engine operation according to the demand signal; and
    a manipulating means to be manipulated by a vehicle driver to input a request to said control means,
    wherein said control means prohibits a display from displaying the information on the engine operation when permitting the engine operation even when said separated communication device provides the demand signal to prohibit engine operation.

7. A vehicle security control system as in claim 6, wherein said control means permits said manipulating means to prohibit the engine operation when said control means prohibits the engine operation according to the demand signal to prohibit engine operation.

8. A vehicle security control system as in claim 6, wherein said control means continues to prohibit the engine operation and controls said manipulating means to permit operation to prohibit the engine operation when said control means prohibits the engine operation according to the demand signal to prohibit engine operation although said first communication unit receives the ID signal.

9. A vehicle security control system as in claim 6, wherein said control means continues to prohibit the engine operation when said manipulating means is operated and permits said manipulating means to prohibit the engine operation when said control means prohibits the engine operation according to the demand signal to prohibit engine operation.

10. A vehicle security control system as in claim 6, further comprising a display for displaying information of the engine operation, wherein:
    said manipulating means is manipulated according to information displayed by said display; and
    said control means prohibit engine operation by prohibiting said display from displaying the information on the engine operation.

11. A vehicle security control system as in claim 10, wherein the information displayed by the display includes information on the demand signal to permit engine operation.

12. A vehicle security control system that receives from a separated communication device a demand signal to set or unset an engine immobilizer of an engine control unit, said vehicle control device comprising:
- a display for displaying information on the engine operation;
- a communication unit for receiving the demand signal for said separated communication device;
- a remote security ECU for providing a control signal according to the demand signal; and
- an immobilizer ECU for setting or unsetting the immobilizer according to the control signal;
- wherein said immobilizer ECU prohibits said display from displaying the information on the engine operation when said separated communication device sends the demand signal to set the immobilizer if said immobilizer ECU has unset said immobilizer.

13. A vehicle security control system that receives from a separated communication device for receiving a remote set signal for setting an engine immobilizer to prohibit engine operation, said vehicle control device comprising:
- a key for operating the vehicle, said key providing an ID signal when it is used;
- a first communication unit for receiving the ID signal;
- a second communication unit for receiving the remote set signal from said separated communication device;
- an engine control unit including said engine immobilizer; and
- a manipulating means to be manipulated by a vehicle driver to input a request for setting or unsetting the engine immobilizer to said engine control unit,
- wherein said engine control unit prohibits a display from displaying the information on the engine operation when unsetting the immobilizer if said second communication unit receives the remote set signal.

14. A vehicle security control system as in claim 13, wherein said engine control unit permits said manipulating means to set said immobilizer if said engine control unit has prohibited the engine operation according to the demand signal to prohibit engine operation.

15. A vehicle security control system as in claim 13, wherein said engine control unit continues to set the immobilizer and controls said manipulating means to permit operation to set the immobilizer if said engine control unit has set the immobilizer according to the demand signal to set the immobilizer although said first communication unit receives the ID signal.

16. A vehicle security control system as in claim 13, wherein said engine control unit continues to set said immobilizer when said manipulating means is operated and permits said manipulating means to set the immobilizer if said engine control unit sets the immobilizer according to the demand signal to set said immobilizer.

* * * * *